Oct. 10, 1939.   O. P. WODACK ET AL   2,175,499
PORTABLE TOOL
Filed June 18, 1936   2 Sheets-Sheet 1
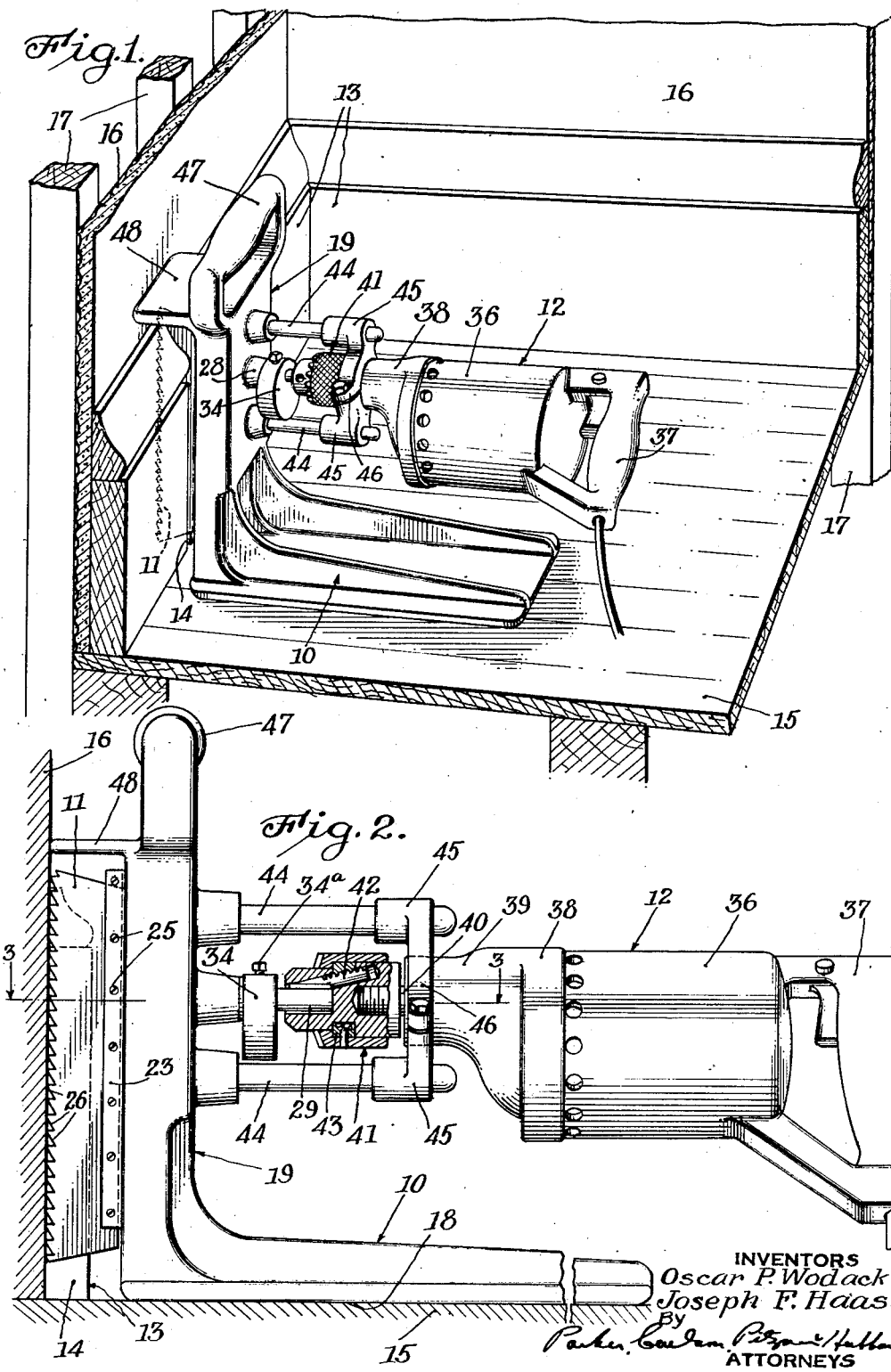
INVENTORS
Oscar P. Wodack +
Joseph F. Haas.
BY
ATTORNEYS Oct. 10, 1939.  O. P. WODACK ET AL  2,175,499
PORTABLE TOOL
Filed June 18, 1936   2 Sheets-Sheet 2
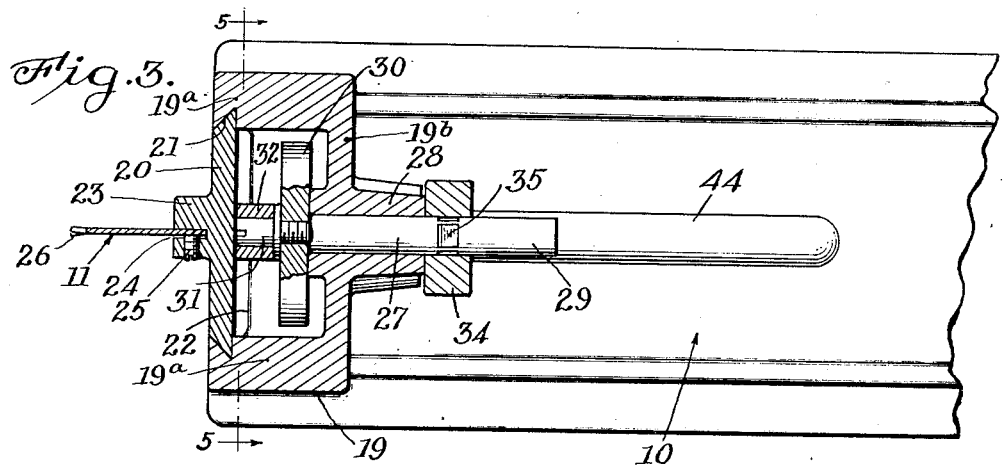
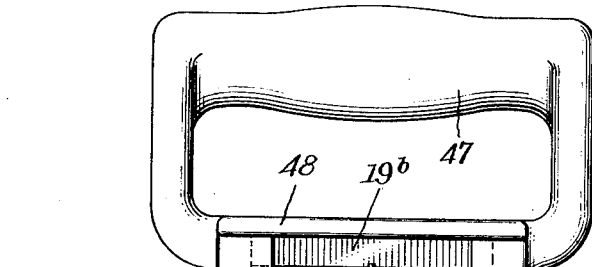
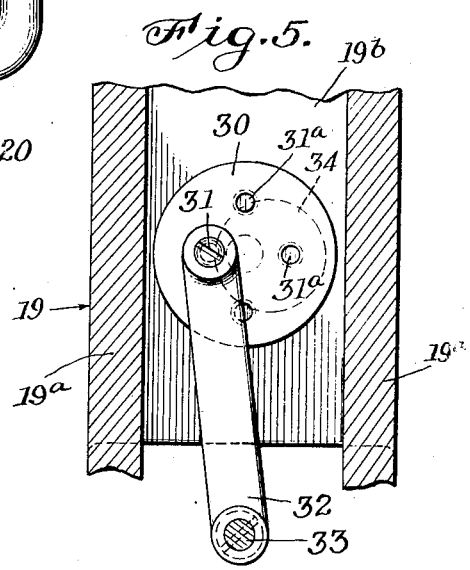
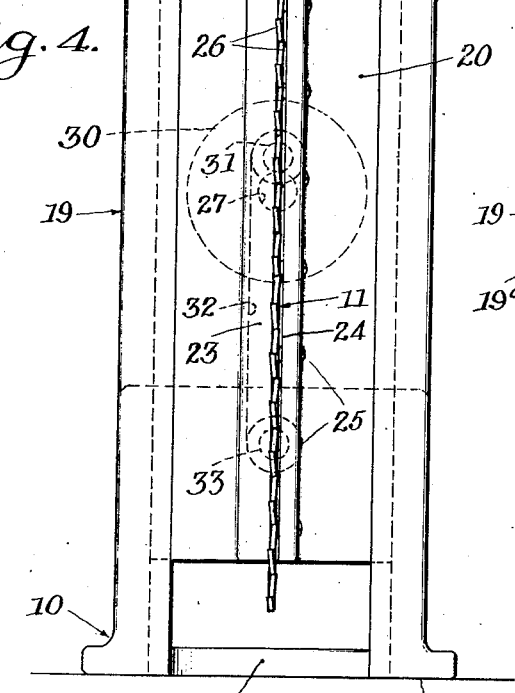
INVENTORS
Oscar P. Wodack
Joseph F. Haas.
BY
ATTORNEYS

Patented Oct. 10, 1939

2,175,499

UNITED STATES PATENT OFFICE 2,175,499

PORTABLE TOOL

Oscar P. Wodack, River Forest, and Joseph F. Haas, Forest Park, Ill., assignors to Wodack Electric Tool Corporation, Chicago, Ill., a corporation of Illinois Application June 18, 1936, Serial No. 85,924

12 Claims. (Cl. 143—68)

The invention relates generally to portable tools and more particularly to a power driven reciprocatory saw especially adapted for cutting baseboards and other interior finishing strips so as to avoid the necessity of removing such strips from their positions adjacent to other finished portions of a building.

The primary object of the invention is to provide a tool of the character indicated, whereby the cutting operation may be performed smoothly and rapidly, and without damage to the adjacent finished surfaces to which such strips may be attached.

A further object is to provide a tool in which the cutting operation is independent of the structural characteristics of the wall or other supporting surface.

Another object is to provide such a tool comprising a portable power unit such as an ordinary electric drill and a cutting unit including a supporting base and guide, which units are combined in such a manner that the power unit may be detached and utilized as a rotary drill or as a driver for other types of tools.

Other objects and advantages will become apparent from the following description taken in connection with the accompanying drawings which illustrate a preferred embodiment of the invention, and in which:

Figure 1 is a perspective view of a tool embodying the invention, the tool being shown in its operative relation to a baseboard.

Fig. 2 is a side elevational view of the tool showing the chuck of the drill unit in longitudinal section.

Fig. 3 is a plan section taken on the line 3—3 of Fig. 2 along the axis of the drive shaft, the drill unit being removed from its operative association with the saw unit.

Fig. 4 is a front elevational view of the saw unit.

Fig. 5 is a fragmental vertical sectional view of the saw unit taken substantially along the line 5—5 of Fig. 3.

As herein illustrated, the invention is embodied in a cutting unit having a base 10 upon which a saw blade 11 is movably mounted for vertical reciprocation by a motor operated power unit 12 which is carried by the base 10 in perpendicular relation to the saw blade. Said power unit 12 is in the form of a conventional electric drill adapted for easy detachment from the cutting unit.

In the preferred embodiment, the tool is adapted to cut a baseboard 13, such as that shown in Figs. 1 and 2, by imparting lengthwise reciprocation to the saw blade 11 along a vertical path. In such operation the tool is advanced to feed the saw toward the forward face of the baseboard 13, so as to form a kerf 14 therein of substantially uniform depth from top to bottom as the cutting operation progresses from the front to the rear face of the baseboard. The baseboard 13 at its lower edge abuts a horizontal floor 15 and is positioned in front of the lower edge of a finished plaster wall 16 supported by spaced vertical studs 17, and in severing the baseboard, damage to the plaster 16 is avoided by terminating the feeding movement of the saw blade 11 prior to engagement of the saw with the plaster.

In advancing the saw blade 11 toward the baseboard, preferably the entire base 10 is moved with a sliding action along the floor 15 and to insure stability in such movement the base 10 is in the form of a flat slide plate with a smooth bottom surface 18 (Fig. 2) of comparatively large area. At one end the base 10 has a rigid standard 19 upon which the saw blade 11 is mounted for reciprocation by means of a sliding head or carrier 20.

As shown in Fig. 3, the standard 19 comprises two spaced side members 19ª having adjacent their edges opposed V-shaped grooves 21 within which the complemental edges of the head 20 are slidably fitted. The head is thereby adapted for vertical reciprocation along one end of the base 10, and it will be noted in Fig. 4 that the grooves 21 extend through the bottom surface 18 and that the base is cut away at 22 to provide clearance for removal of the head 20 downwardly from the grooves 21. Along the outer or forward surface of the head 20 a vertical rib 23 is formed having an elongated groove 24 therein to receive the rear edge of the saw blade 11 which is clamped in position by a plurality of set screws 25 entering the groove laterally through one side of the rib 23.

The saw blade 11 is in the form of an elongated strip with teeth 26 formed from end to end along its forward edge. Also, it is of substantial width so that the teeth 26 are spaced forwardly from the supporting rib 23 to permit the cutting of a relatively thick baseboard. The form of the supporting rib 23 is such that both ends of the saw blade 11 are clear whereby to permit the entire blade to operate within the kerf 14 cut thereby.

Spaced rearwardly from the head 20 and joining the rear edges of the side walls 19ª of the standard 19 is a vertical cross wall 19ᵇ forming a housing for the mechanism which reciprocates the head 20. This mechanism preferably comprises a shaft 27 horizontally journalled in a bearing 28 carried by the cross wall 19ᵇ, with one end 29 projecting over the base 10 and the other end extending into the housing of the standard and carrying a crank-disk 30.

The disk 30 has a bearing pin 31 screw-threaded therein eccentrically with respect to the shaft 27 and a connecting rod 32 has one end pivoted on the pin 31 while the other end is pivoted to the head 20 by a pin 33. Thus, when the shaft 27 is rotated the head 20 is reciprocated and the stroke of such reciprocation may be varied by changing the location of the bearing pin 31 selectively to one of a plurality of screw-threaded holes 31a (Fig. 5) formed in the disk 30 at different distances from the axis of the disk. On the projecting end 29 of the shaft 28 an eccentric counterbalancing weight 34 is mounted to offset the eccentric mass of the connecting rod 32, and the position of the weight about the shaft may be changed in accordance with the position of the pin 31 by unloosening a set screw 34a which is selectively engageable with a plurality of flat surfaces 35 formed on the shaft (Fig. 3) to fix the counterweight in position.

For any particular length of stroke, the saw blade 11 is adjusted in the head 20 so that when the head is in its extreme lower position the lower end of the saw is alined with the bottom surface 18 of the base 10 whereby to cut the baseboard 13 to its extreme lower edge.

The rotary drill unit 12 illustrated has a motor housing 36 at one end of which a trigger-grip handle 37 is fixed for supporting and controlling the operation of the motor contained in the housing. At the other end of the housing 36 is a gear box 38 terminating in a hub 39 through which a projecting driven spindle 40 (Fig. 2) extends. On the spindle 40 a chuck 41 is carried, the chuck preferably being of the collet type wherein a plurality of jaws 42 are moved radially into contact with a tool by rotation of a knurled outer sleeve 43.

In associating the drill unit 12 with the cutting unit, the chuck 41 is slipped over and tightened upon the end 29 of the shaft 27, and in the endwise movement the motor housing 36 is brought into operative relation to supporting means carried by the cutting unit. This supporting means preferably comprises a pair of rigidly fixed rods 44 extending from the cross wall 19b of the column rearwardly over the base 10 on opposite sides of and parallel to the shaft 27. The rods are slidably engaged by sleeves 45 fixed on opposite sides of a split clamping collar 46 which is secured about the hub 39 of the drill unit 12. Thus by clamping the chuck 41 to the shaft 27, the sleeves 45 are held axially on the rods 44 so as to support the drill unit 12 on the base 10.

When thus mounted, the handle 37 of the drill unit is positioned on the end remote from th chuck 41, and this handle is utilized in conjunction with a handle 47 at the top of the column 19 to move and guide the device in the performance of a sawing operation. Since the handle 47 is adjacent to the upper end of the saw blade 11, a flat guard plate 48 is provided, extending forwardly from the column 19 immediately below the handle 47 and over the upper end of the blade. The forward edge of the guard plate 48 is preferably alined with the tips of the saw teeth 26 so that contact of the guard plate with the plaster 16 will limit the advancing movement of the tool and prevent injury to the plaster.

It will be apparent that we have provided a cutting tool which is especially adapted for use in the installation of air registers and ducts necessitating the cutting of baseboards, it being possible to remove sections of a baseboard without reference to the location of the studs within the wall and without damage to the plaster of the wall. The tool is capable of rapid, smooth and easy operation; its construction is simple; and the power unit is detachable for other uses.

We claim as our invention:

1. A portable tool comprising a cutting unit having a base with a standard at one end thereof, a shaft rotatably mounted in and projecting horizontally from one side of said standard toward the other end of said base, a head mounted for vertical reciprocation along the other side of said standard, an elongated saw blade fixed on said head with its teeth facing away from the standard and with the ends of the saw clear to permit operation of the entire blade in a kerf formed thereby, a connection operable by rotation of said shaft to reciprocate said head, a handle on said standard for manipulating the device, and a separable operating unit comprising a motor operated rotary drill having a handle, and a tool chuck adapted to engage said shaft for rotating the same, said cutting unit and said drill having interengageable means for supporting the drill in fixed position on said cutting unit whereby to enable an operator to utilize the handles of both units in manipulating the device.

2. A portable tool comprising an elongated base having a lower surface adapted to rest upon and slide along a floor, an upstanding support at one end of said base, a head mounted on said support for vertical reciprocation, a saw blade having teeth along its forward edge from end to end, means engaging the other edge of the saw blade to support it on said head parallel to the path of reciprocation of the head and with the saw teeth projecting beyond said end of the base, a horizontal shaft rotatably mounted in said support and projecting therefrom toward the other end of the base, means operable by rotation of said shaft to reciprocate said head, a pair of rods projecting from said support parallel to said shaft, a rotary drill unit having a tool chuck adapted to be detachably connected to said shaft, and means on the rotary drill unit to engage said rods and cooperate with said shaft in supporting the rotary drill above said base.

3. A tool of the character described comprising a movable support having a forward face to be moved toward the surface of a piece of work, a head guided on said support for reciprocation across said forward face thereof, an elongated saw blade of substantial width from edge to edge positioned on said head parallel to the path of reciprocation of said head, means clamping the back edge of said saw blade to said head, said blade having teeth along its other edge facing away from said head, a shaft rotatably mounted in said support substantially perpendicular to said path, a connecting rod and crank mechanism operatively connecting said shaft with said head for reciprocating the head, and a counterbalancing weight on said shaft to offset the eccentric mass of said mechanism.

4. A tool of the character described comprising a movable support having a forward face movable toward the surface of a piece of work, a head guided on said support for reciprocation across said forward face thereof, an elongated saw blade of substantial width from edge to edge positioned on said head parallel to the path of reciprocation of said head, means clamping the back edge of said saw blade to said head, said blade having teeth along its forward edge facing away from said head, a shaft rotatably mounted in said support substantially perpendicular to said path, a crank-disk on said shaft having a plurality of holes therein parallel to the axis of the shaft and spaced at different distances from said axis, a bearing pin adapted to be selectively mounted in one of said holes, a connecting rod pivoted at its opposite ends to said pin and to said head for reciprocating the head when said shaft is rotated, and a counterbalancing weight mounted on said shaft for adjustment to correspond to the position of said pin on said disk.

5. A tool for cutting baseboards and the like, comprising a base having a flat bottom surface of substantial area providing a stable support for sliding the base over a floor, a head reciprocably mounted on one end of said base along a path which is substantially perpendicular to said flat bottom surface of the base, an elongated saw blade of substantial width having its rear edge secured in said head parallel to said path and having teeth along its forward edge facing away from said base and extending to the lower end of the saw blade, and means for reciprocating said head through a predetermined stroke at the lower end of which stroke the lower end of said saw blade is substantially alined with said flat bottom surface of the base.

6. A tool for cutting baseboards and the like, comprising a base adapted to slide along the floor toward the baseboard, a head reciprocable at one edge of said base, an elongated saw blade positioned perpendicular to the outer face of said head with teeth extending entirely along the outer edge and facing away from said head, means engaging the back edge of said saw blade to clamp it to said head, said means being spaced from said teeth so that the entire length of the saw may be positioned and operated in a kerf cut thereby, means for reciprocating said head through a predetermined stroke, and a stop on said base adapted to abut the plaster adjacent to the baseboard to limit the depth of cut.

7. A tool for cutting baseboards and the like, comprising a base adapted to slide along the floor toward the baseboard, a head reciprocable vertically along one end of said base, an elongated saw blade positioned in a vertical plane perpendicular to the outer face of said head with teeth extending entirely along the outer edge and facing away from said head, means engaging the back edge of said head to clamp the blade to said head, said means being spaced from said teeth so that the entire length of the saw may be position and operated in a kerf cut thereby, means for reciprocating said head through a predetermined stroke, and a guard on said base projecting over said saw and having its outer end in the plane of the tips of said saw teeth to constitute a depth gauge for abutment with the plaster above the baseboard.

8. A tool for cutting baseboards and the like, comprising a base adapted to slide along the floor toward the baseboard, a head reciprocable vertically along one end of said base, an elongated saw blade positioned in a vertical plane perpendicular to the outer face of said head with teeth extending entirely along the outer edge and facing away from said head, means engaging the back edge of said head to clamp the blade to said head, said means being spaced from said teeth so that the entire length of the saw may be positioned and operated in a kerf cut thereby, means for reciprocating said head through a predetermined stroke, and a guard on said base projecting over said saw.

9. A tool for cutting baseboards and the like comprising, in combination, a base adapted to rest upon and be moved along the floor toward the baseboard to be cut, an upright standard rigid with the forward end of said base, a head mounted for reciprocation in a predetermined stroke up and down along the forward face of said standard, an elongated saw blade secured along its rear edge to said head for longitudinal movement therewith and having teeth along its outer edge facing forwardly from said head, said blade being of a width beyond said head great enough to permit said teeth to pass entirely through the baseboard to sever the same, and means for reciprocating said head to carry said teeth in a cutting stroke across the baseboard.

10. A tool for cutting attached baseboards and the like comprising, in combination, a base to be moved over the floor toward the baseboard to be cut, a vertical standard upon said base, a saw blade of a width substantially greater than the thickness of the baseboard and having teeth along its forward edge, means carried by said standard for supporting said blade along its rear edge to project perpendicularly forwardly clear of said standard to engage the baseboard, and means for reciprocating said blade supporting means to carry the blade in a predetermined cutting stroke at the lower end of which the lower end of the blade is substantially alined with the floor and at the upper end of which the upper end of the blade extends beyond the upper edge of the baseboard.

11. In combination in a unitary portable tool for cutting attached baseboards and the like, a base movable over a floor toward the baseboard, a standard rising from said base, an elongated saw blade mounted for reciprocal movement vertically in a plane perpendicularly edgewise to the front of said standard and clearing the latter to extend into a kerf the depth of the baseboard thickness, means for reciprocating said saw blade in a cutting stroke, said reciprocating means including a saw holding device to engage the back portion of the blade and a power unit mounted upon said standard below the top thereof behind and intermediate the ends of the reciprocatory cutting stroke of the saw on an axis located in the plane of said blade, and a handle at the rear of said power unit to be grasped for applying cutting pressure forwardly in the plane of said blade.

12. A portable tool for cutting attached baseboards or the like comprising, in combination, a blade of greater width than a baseboard to be cut and having teeth along substantially all of one edge, a blade holding device to engage the back of the blade spaced from said teeth sufficiently to permit entry of the blade edgewise through the full thickness of the baseboard, said blade holding device leaving the opposite ends of the blade free for movement within the kerf produced in the cutting operation, means for supporting said blade holding device for reciprocation in a predetermined cutting stroke up and down across the baseboard including a standard upon the front of which said holding device is slidable and a base for the standard movable over a floor to carry the standard toward the baseboard, and means carried by said supporting means for reciprocating said blade holding device.

JOSEPH F. HAAS.
OSCAR P. WODACK.